UNITED STATES PATENT OFFICE.

ALBERT G. MANNS, OF CHICAGO, ILLINOIS, ASSIGNOR, BY DIRECT AND MESNE ASSIGNMENTS, TO FOOD & FIBER PRODUCTS COMPANY, OF CHICAGO, ILLINOIS, A CORPORATION OF ILLINOIS.

PROCESS FOR PREPARING FIBER FROM CORNSTALKS AND ANALOGOUS PITHY PLANTS.

No. 811,419.     Specification of Letters Patent.     Patented Jan. 30, 1906.

Application filed April 14, 1905. Serial No. 255,540.

*To all whom it may concern:*

Be it known that I, ALBERT G. MANNS, a citizen of the United States, residing at Chicago, in the county of Cook and State of Illinois, have invented a certain new and useful Process for Preparing Fiber from Cornstalks and Analogous Pithy Plants, of which the following is a specification.

This invention relates to an improved process for preparing fiber from cornstalks and analogous pithy plants; and among the salient objects of the invention are to produce an improved quality of fiber, to subject the material to a treatment which will remove the non-fibrous substance, including coloring-matter, to a large extent before the material is subjected to the reducing action of disintegrating chemicals, to produce a pulp which is of more uniform quality and more free from shive, to economize either in the amount of reducing chemicals or the time employed in bringing the fiber to its completed condition, or both, to reduce the amount of bleaching agents and time of bleaching required, to provide a process which enables certain valuable constituents of the material other than the fiber to be separated out and saved without interfering with the series of steps embodying the process, and in general to provide a simple and improved process for the purpose described.

The reduction of cornstalks and analogous pithy plants to form fiber suitable for paper-making and analogous uses is not new. Heretofore it has been customary to take the cornstalk or analogous material, sometimes in shredded, comminuted, or partially-comminuted form and sometimes whole or without mechanical division, and as the first step of the actual reducing treatment have subjected the raw material to a cooking process in a chemically-charged reducing liquor, usually a caustic solution. Difficulty has been experienced in securing a proper reduction of the material, because of the widely-different character of the shell and pith portions, because of the pigment contained in the material, and for other reasons unnecessary to enumerate. Obviously when the raw material is placed directly in a chemical reducing solution and cooked all of those constituents of the plant susceptible to destruction by such treatment are lost. I have discovered that by subjecting the material to a preliminary extracting process in conjunction with water and heat a very large proportion of the substance of the plant is dissolved and may be separated therefrom, thereby effecting a long step in the direction of the ultimate reduction to fiber and enabling the soluble matters thus removed to be utilized in the production of a food extract or for other purposes.

In carrying out my improved process I first place the cornstalks, bagasse, or analogous material in a suitable vessel together with a sufficient quantity of water to submerge the material and then apply heat, and thereby subject the material to an extracting process, whereby the constituents of the material soluble in water are dissolved and set free. I have found in practice that the stalks may be advantageously cooked for from three and one-half to four hours at the temperature of boiling water under atmospheric pressure—*i. e.*, about 212° Fahrenheit. Of course the same end may be secured by a longer period of cooking and a lower temperature, or the process may be somewhat shortened by cooking in a closed vessel under higher temperature—*i. e.*, by cooking with superheated steam. This cooking process is effective whether the stalks be shredded or mechanically divided or treated whole or in the condition in which they came from the field. After the mass has been cooked or subjected to this extracting step for a sufficient length of time the liquor is drained away or otherwise separated from the mass of the material, and the latter will be found to be in a soft more or less pulpy condition and very considerably lighter in color than during the initial stage of the treatment.

As before stated, the extract liquor may be separated from the mass by drainage; but it may also be separated by expressing or otherwise.

It is known that cornstalks, bagasse, and analogous giant members of the *genus gramineæ* are made up largely of two distinct and radically different kinds of cells available for making fiber. The shell of the stalk is chiefly composed of long filamentary fibers, which are the most indestructible fibers of the plant. The pithy portions of the plant are composed chiefly of relatively large irregular or ovoidal shaped shells, which under the microscope are seen to be hollow bladder-like bags, the interiors of which are more readily destructible than the outer walls. These parenchymatous cells are much more readily destructible than the filamentary cells, and I have discovered that when subjected to the action of a reducing liquor, such as caustic soda, these cells are quite readily destroyed, the interior portions of the cells being apparently first dissolved away, thus making the walls thinner and thinner until finally the cells rupture and completely disintegrate.

I have further discovered that if the raw stalks taken in their naturally dry or approximately dry condition be placed directly in a reducing solution and given a treatment sufficiently drastic to effect disintegration of the intercellular structure a very considerable percentage of the pith-cells will be destroyed by the time this necessary disintegration has been reached. I have also demonstrated that by subjecting the mass to the preliminary cooking and extracting in water hereinbefore described the subsequent reduction by the use of caustic soda or other suitable reducing liquor may be effected with a much milder treatment with much more uniform results and without destroying any considerable proportion (if any) of the pith-cells.

It will be obvious from the foregoing that the successful carrying out of that step of my present process which consists in cooking the mass in a chemical reducing solution depends upon an intelligent effort to secure the desired result—namely, to effect the complete disintegration of the intercellular matter, setting free of the ultimate fiber, both filamentary and parenchymatous, without destroying a large percentage of this ultimate fiber.

The fibrous mass is therefore next subjected to a cooking treatment in a suitable vessel with the usual reducing reagents, such as a caustic-soda solution or a sulfurous-acid solution, depending upon the character of fiber it is desired to produce. The length of time required to reduce the fibrous material to a disintegrated condition in which the fiber is freed from the intercellular structure is much less than that ordinarily required where no preliminary cooking treatment has been given it. Moreover, it is found that a much weaker reducing solution is effective than where the plant is reduced directly from its raw state by cooking in the reducing solution in the first instance and the reduction to a disintegrated condition is much more uniform, doubtless owing to the fact that the shell portions, and particularly the nodes, are by the preliminary cooking thoroughly softened and partially disintegrated. In practice I have found that a saving of approximately one-third of the reducing agent may be effected or with the use of a stronger solution a corresponding reduction in time may be effected, it being well understood by those skilled in the art that the strength of the reducing solution and the temperature largely governs the length of time required to complete the treatment. For example, in reducing with caustic-soda solution I have found that in treating corn-stalks a cooking treatment extending over five to ten hours at a pressure of approximately one hundred pounds with a solution of about fifteen-per-cent. strength is effective in reducing the mass to a disintegrated condition without destroying any considerable proportion of the pith-cells. The treatment may be continued somewhat longer under the same conditions without reducing the yield much, or a somewhat stronger reducing solution may be used for a corresponding shorter time or at a correspondingly lower temperature without materially reducing the yield. On the contrary, if a solution of double the strength mentioned be employed and the treatment continued for from six to ten hours it will be found that the gross yield of fiber will be very materially lessened, and this loss will be chiefly due to the destruction of the pith-cells. The fact that the reduction is more uniform is evidenced by the absence of any considerable percentage of shive at the time when the mass has reached a disintegrated condition and is further evidenced by the increased percentage of fiber recovered from a given amount of material. Each of these two kinds of fiber possesses distinct characteristics and lends peculiar characteristics to the paper produced therefrom. Sometimes it is desirable to separate the two kinds of fiber, and when this is the case the next step of the process is to effect a separation of the mass by repeated or continued washing and screening, a suitable screen or screens being used which will permit the ovoidal cell fiber to pass through the machine while retaining the filamentary fiber. This step of the process is best effected by the use of a machine or apparatus which maintains a repeated or constant agitation of the mass while it is being passed over and through the screen, the pulp being maintained in a relatively dilute condition, so as to facilitate the flowing out and passing through the screens of the ovoidal fiber.

The two kinds of fiber thus separated are in condition for use for some purposes without further treatment; but ordinarily it is necessary to bleach the fiber, and this is accomplished in the usual way by agitating the fiber in a bleaching solution.

It is to be noted that owing to the fact that a large percentage of the pigment or coloring-matter contained in plants of this character is soluble in water, especially in hot water, the fiber is of relatively light color before bleaching and accordingly a weak bleaching solution or a short period of treatment is sufficient to effect the complete bleaching of the fiber. It follows that I not only effect a substantial saving at this stage of the treatment, but I have also found that the character of the fiber as finally produced is improved. This is doubtless due to the more uniform reduction and the use of less drastic treatment both in the reducing liquor and in the bleach.

While I have described the process as preferably carried out, yet it will be understood by those skilled in the art that the process may be varied without departing from the spirit of the invention, and accordingly I do not limit myself to the precise details herein described except to the extent that they are made the subject of specific claims.

I claim as my invention—

1. The process of preparing fiber from corn-stalks, bagasse and analogous plants of the same genus, which consists in first practically freeing the fibrous mass from water-soluble constitutents by subjecting the raw material to the action of a heated hydrous bath to effect dissolution of said constituents and the separating the solution from said mass, next subjecting the fibrous material to a digesting cook in a suitable reducing liquor drastic enough to effect moderately rapid disintegration of the intercellular tissues and incrustaceous matters but not drastic enough to effect at the same time the destruction of any large proportion of the pith-cells, continuing this digesting treatment under controlled conditions until the pith and filamentary cells are substantially set free from the connective tissues and finally separating and recovering said cells from the disintegrated mass.

2. A process of preparing fiber from corn-stalks, bagasse and analogous pithy plants which consists in subjecting the raw material to a preliminary extracting and softening process with water, separating the extracting liquor and extracts contained in solution therein from the fibrous material, then cooking the fibrous material in a usual reducing liquor until the mass is disintegrated and the fibers freed from the intercellular structure and then separating the two kinds of fiber by washing and screening.

3. The process of preparing fiber from corn-stalks, bagasse and analogous plants of the same genus which consists in first practically freeing the fibrous mass from water-soluble constitutents by subjecting the raw material to the action of a heated bath of water or steam to effect dissolution of said constituents and then separating the solution from said mass, next subjecting the remaining fibrous material to a digesting cook under pressure in a suitable reducing liquor drastic enough to effect moderately rapid disintegration of the intercellular tissues and incrustaceous matters but sufficiently mild to prevent effecting at the same time the destruction of any large proportion of the pith-cells, continuing this digesting treatment under controlled conditions until the pith and filamentary cells are substantially set free from the connective tissues and finally separating and recovering said cells from the disintegrated mass.

4. The process of preparing fiber from corn-stalks, bagasse and analogous plants of the same genus, which consists in first practically freeing the fibrous mass from water-soluble constituents by subjecting the raw material to the action of a heated hydrous bath and effecting dissolution of said constituents and then separating the solution from said mass, next subjecting the fibrous material to a digesting cook in a suitable reducing liquor drastic enough to effect moderately rapid disintegration of the intercellular tissues and incrustaceous matters but sufficiently mild to prevent at the same time the destruction of any large proportion of the pith-cells, continuing this digesting treatment under controlled conditions until the pith and filamentary cells are substantially set free from the connective tissues, then separating the fiber from the reducing solution and finally treating the fiber in a bleaching solution.

5. The process of preparing fiber from corn-stalks bagasse and analogous plants of the same genus, which consists in first practically freeing the fibrous mass from the water-soluble constituents by subjecting the raw material to the action of a heated hydrous bath and thus effecting dissolution in said constituents, then separating the solution from said mass, next subjecting the fibrous material to a digesting cook in a suitable reducing liquor drastic enough to effect moderately rapid disintegration of the intercellular tissues and incrustaceous matters but mild enough to prevent the destruction at the same time of any large proportion of the pith-cells, continuing this digesting treatment under controlled conditions until the pith and filamentary cells are substantially set free from the connective tissues, then separating the fiber from the reducing solution and finally beating the fiber.

ALBERT G. MANNS.

Witnesses:
H. E. OTTE,
F. H. ERICSON.